(12) United States Patent
Scott et al.

(10) Patent No.: US 10,473,794 B2
(45) Date of Patent: Nov. 12, 2019

(54) RADIATION DETECTION DEVICE AND METHOD

(71) Applicant: University of Bristol, Bristol (GB)

(72) Inventors: Thomas Scott, Bristol (GB); James Macfarlane, Bristol (GB)

(73) Assignee: University of Bristol, Bristol (GB)

( * ) Notice: Subject to any disclaimer, the term of this patent is extended or adjusted under 35 U.S.C. 154(b) by 498 days.

(21) Appl. No.: 14/774,003

(22) PCT Filed: Mar. 7, 2014

(86) PCT No.: PCT/GB2014/050676
§ 371 (c)(1),
(2) Date: Sep. 9, 2015

(87) PCT Pub. No.: WO2014/140536
PCT Pub. Date: Sep. 18, 2014

(65) Prior Publication Data
US 2016/0018532 A1    Jan. 21, 2016

(30) Foreign Application Priority Data
Mar. 11, 2013  (GB) .................................. 1304335.1

(51) Int. Cl.
*G01T 1/00*     (2006.01)
*G01T 7/00*     (2006.01)
(Continued)

(52) U.S. Cl.
CPC .............. *G01T 1/00* (2013.01); *B64C 39/024* (2013.01); *G01T 7/00* (2013.01); *G01V 5/02* (2013.01)

(58) Field of Classification Search
CPC ....... G01T 1/00; G01T 7/00; B64C 2201/141; B64C 2201/00; B64C 2201/146;
(Continued)

(56) References Cited

U.S. PATENT DOCUMENTS 9,003,281 B2 * 4/2015 Hashimoto ............ G06Q 10/10
                                                            358/1.15
2004/0146138 A1 * 7/2004 Jiao ....................... G01T 1/2018
                                                             378/19
(Continued)

FOREIGN PATENT DOCUMENTS

DE         10149888 A1    3/2003
JP        2001039397 A    2/2001
(Continued)

OTHER PUBLICATIONS

Kurvinen et al., "Design of a radiation surveilance unit for an unmanned aerial vehicle", Journal of environmental radioactivity, Elsevier applied science publishers, vol. 81, No. 1, 2005, pp. 1-10.*
(Continued)

*Primary Examiner* — Yara B Green
(74) *Attorney, Agent, or Firm* — Hall Estill Attorneys at Law; Tyler J. Mantooth

(57) ABSTRACT

A radiation detection device (10) comprising a data processor (14) arranged to be communicatively coupled to a position sensor (16) mounted on an unmanned vehicle and a solid state radiation sensor (18) mounted on the unmanned vehicle. The data processor is configured to receive position data from the position sensor, receive radiation data from the solid state radiation sensor and periodically associate the position data with radiation data to form combined data.

22 Claims, 4 Drawing Sheets

(51) Int. Cl.
*B64C 39/02* (2006.01)
*G01V 5/02* (2006.01)

(58) Field of Classification Search
CPC ......... B64C 27/00; B64C 27/08; B64C 27/20;
B64C 39/024; B64D 47/08; G08C 17/07;
H04B 7/18504; G01V 5/02
See application file for complete search history.

(56) References Cited

U.S. PATENT DOCUMENTS

| | | | |
|---|---|---|---|
| 2009/0283686 | A1 | 11/2009 | Barnes et al. |
| 2011/0077799 | A1 | 3/2011 | Barnes et al. |
| 2012/0091356 | A1 | 4/2012 | Oh et al. |
| 2014/0172200 | A1* | 6/2014 | Miralles .................. G05D 1/12 701/3 |

FOREIGN PATENT DOCUMENTS

| | | |
|---|---|---|
| JP | 2004256022 A | 9/2004 |
| WO | 01/28115 A1 | 4/2011 |

OTHER PUBLICATIONS

Boudergui et al., "development of a drone equipped with optimized sensors for nuclear and radiological risk characterization",, IEEE, Jun. 6, 2011, pp. 1-9.*
Pollanen et al., "Radiation surveillance using an unmanned aerial vehicle", Applied Radiation and Isotopes, vol. 67, No. 2, Feb. 1, 2009, pp. 340-344.*
Safety Standards for Railroad Clearances and Walkways in Private Rail Yards and Plants, Chapter 296-860WAC, Retrieved on [Sep. 7, 2018]; Retrieved from url <www.lni.wa.gov/Safety/Rules/Chapter/860/WAC296-860.pdf>, published Jan. 5, 2016. (Year: 2016).*
California High-Speed Train Project, Retrieved [Sep. 7, 2018], Retrieved from url <www.hsr.ca.gov/docs/programs/eir_memos/Proj)Guidelines_TM3_2_3R00.pdf>; published Jul. 17, 2009. (Year: 2009).*
"Propulsion System," NASA, Retrieved [Jun. 21, 2019]; Retrieved from url <https:www.grc.nasa.gov/www/k-12/rocket.html>; published Jun. 12, 2014. (Year: 2014).*
Jerry Towler, Bryan Krawiec and Kevin Kocheresberger, "Radiation Mapping in Post-Disaster Environments Using an Autonomous Helicopter," Remote Sensing, Jul. 5, 2012, pp. 1995-2015, www.mdpi.com/journal/remotesensing. X.
Roy Pollanen, Harri Toivonen, Kari Perajarvi, Tero Karhunen, Tarja Hander, Jukka Lehtinen, Kimmo Rintala, Tuure Katajainen, Jarkko Niemela & Marko Juusela, Radiation Surveillance Using an Unmanned Aerial Vehicle, Applied Radiation and Isotopes, 2009, pp. 340-344, No. 67, Elsevier Ltd.
Radiation Surveillance and Unmanned Aerial Vehicles,: Radiation and Nuclear Safety Authority, Oct. 16, 2012, STUK-TTL-FLYER 2011-008, pp. 1-2, STUK, Helsinki Finland.
K. Kurvinen, P. Smolander, R. Pollanen, S. Kuukankorpi, M. Kettunen and J. Lyytinen, "Design of a Radiation Surveillance Unit for an Unmanned Aerial Vehicle," Journal of Environmental Radioactivity, 2005, pp. 1-10, No. 81, Elsevier, Ltd.
"Unmanned Aerial Radiation Measurement Solution," Innovation & Measurement Systems, pp. 1-2, www.imsrad.com, France.
"Radioprotection and Spectrometry," Innovation & Measurement Systems, pp. 1-4, www.imsrad.com, France.
"Casper 200/250 Miniature UAV," Defense Update: International Online Defense Magazine, 204, pp. 1-2, Is. 2, http://www.defense-update.com/products/c/casper200.htm.
"List of UAV Applications," Barnard Microsystems, pp. 1-3, http://www.barnardmiscrosystems.com/L4E_radiation_watch_htm.

* cited by examiner

RADIATION DETECTION DEVICE AND METHOD

BACKGROUND

The level of radiation present at a location can change without warning. For example, a failure at a nuclear power plant or storage facility can result in a rapid increase in the level of radiation at the failure location.

While a large scale failure may be obvious to a person in the vicinity of the failure location, a small scale failure, such as a crack in a container filled with radioactive material, may be less apparent and may therefore go unnoticed for a period of time.

Likewise, there are situations in which the level of radiation at a location may increase gradually over time; for example, within pipes used for oil extraction. This is known as naturally occurring radiological material/matter (NORM).

Such formation of a radioactive location can be life threatening to a person in the vicinity of the radioactive location, especially if the person is unknowingly exposed to the radiation for a prolonged period of time.

SUMMARY

According to a first aspect of the invention, there is provided a radiation detection device comprising a data processor arranged to be communicatively coupled to: a position sensor mounted on an unmanned vehicle; and a solid state radiation sensor mounted on the unmanned vehicle, the data processor being configured to:

receive position data from the position sensor;
receive radiation data from the solid state radiation sensor; and
periodically associate the position data with radiation data to form combined data.

Thus, the radiation detection device according to the first aspect of the invention includes a data processor which periodically combines position data with radiation data to produce combined data. The use of a solid state radiation sensor enables high resolution mapping of radiation levels at particular locations. The radiation and position data originates from an unmanned vehicle, which can patrol a monitoring zone within which a radioactive anomaly may occur. Thus, in the event of an increased level of radiation being detected, the combined data produced by the radiation detection device can provide useful information to aid people in the vicinity of the radiation. The use of an unmanned vehicle enables the solid state radiation sensor to remain in close proximity to a target surface within the monitoring zone, which increases the sensitivity of the sensor.

The data processor may be configured to receive radiation data from the solid state radiation sensor at least once every second, preferably at least once every 500 ms and more preferably about once every 100 ms. Fast radiation sensor readout enables accurate radiation mapping at a high spatial resolution while the unmanned vehicle is moving.

The radiation detection device may include a device driver arranged to control the solid state radiation detector. The device driver may be configured to provide a sensor readout which comprises: scanning across a voltage range associated with the detection panel, the voltage range being correlated to a range of possible energy values for detected radiation, the voltage range being partitioned into a plurality of sub ranges or 'bins'; while scanning, monitoring for instances of detected radiation within the sub ranges; and transmitting data relating to instances of detected radiation within the sub ranges to the data processor.

The device driver may be configured to perform less than five, preferably less than three and even more preferably a single sweep across the voltage range. In embodiments of the invention this enables a fast read out time.

The device driver may be configured to transmit data relating to instances of detected radiation within a sub range to the data processor, but not to transmit data relating to sub ranges in which no radiation has been detected. In embodiments of the invention this enables successive read outs to be performed without delays due to bandwidth unavailability.

The data processor may be configured to associate position data with radiation data at least once every second, preferably at least once every 500 ms and more preferably about once every 100 ms. High frequency data association enables the vehicle to move faster during monitoring without missing areas. Combined data may be formed by assigning an identifier, such as a unique reference, to each of a piece of position data and a piece of radiation data.

The data processor may be configured to save the combined data in a memory device and/or transmit the combined data to a remote device. Saving to a local memory may provide a safeguard against transmission errors. Transmitting may enable an operator to detect radioactive threats in real time.

The position sensor may comprise one or more of a: GPS device, a differential fluid pressure sensor, such as an air sensor; an infrared laser sensor; LIght Detection and Ranging (LIDAR), an acoustic sensor. Combinations of sensors may result in more accurate position data.

The solid state radiation sensor may form part of a gamma ray spectroscope, enabling both radiation intensity to be measured and radionuclide type to be determined.

The radiation detection device may comprise the solid state radiation sensor.

The radiation sensor may comprise a plurality of planar detection panels operable in parallel. This may provide a more robust radiation sensor because damage to a subset of the panels will reduce the overall sensitivity of the radiation sensor rather than render the radiation sensor inoperable.

The orientation of a first panel may differ to that of another panel. The orientation of each panel may differ to that of each other panel. Thus, the radiation acceptance envelope for the panel may differ.

The panels may be arranged to define a periphery of a shape, such as a circle, a rectangle, an oval or the like. This enables the radiation sensor to conform to the inners surface of a pipe or the like, along which the unmanned vehicle is arranged to travel.

The radiation sensor may be collimated; for example; the detector panel or panels may each or together be enclosed by a collar extending generally orthogonally with respect to the face or faces of the panel(s). The collar is configured to block or significantly attenuate radiation. This has the advantage of reducing noise from background radiation.

The total sensor area defined by the one or more detection panels may be at least 10 cm$^2$ in size, preferably at least 50 cm$^2$ in size, more preferably at least 100 cm$^2$ in size. In some embodiments, each detection panel may be at least 100 cm$^2$ in size. This provides a sensitive detector capable of detecting 100 Bq or $2\times10^{-6}$ mCi at a distance of 3 m when travelling at a speed of up to 3 m/s.

The radiation detection device may have a mass of 5 kg or less, preferably of 1.5 kg or less, more preferably of 1 kg of less and even more preferably of 500 g or less. A light device may increase the operational capacity of the unmanned vehicle.

In accordance with a second aspect of the invention, there is provided an unmanned vehicle including a radiation detection device according to the first aspect.

The unmanned vehicle may further comprise an attitude stabilisation device, such as a gyroscopic platform, arranged to maintain the orientation of the solid state radiation sensor during movement of the unmanned vehicle. This may increase the accuracy of the mapping between a measured position and the detection of a radiation source aligned with the position, such as directly below the position, which may improve spatial resolution.

The unmanned vehicle may be arranged to move autonomously. During creation of the combined data the unmanned vehicle may be configured to move relative to a target surface of a monitoring zone so as to spaced therefrom by no more than 5 m, preferably by no more than 4 m, more preferably by no more than 3 m and even more preferably by no more than 2 m. It is preferred that the unmanned vehicle is close to the target surface while monitoring for radiation as this provides for increased radiation sensor sensitivity due to the collection of more energy from the ray path from a point source of radiation.

The unmanned vehicle may comprise an unmanned aerial vehicle, such as a multi rotor air vehicle, or an unmanned ground vehicle, or an unmanned submersible/underwater vehicle. When using a multi rotor air vehicle it is preferable to use six or more rotors to provide increased stability.

In accordance with a third aspect of the invention, there is provided a method of detecting radiation using an unmanned vehicle, the method comprising the steps of:
  receiving position data from a position sensor associated with the unmanned vehicle;
  receiving radiation data from a solid state radiation sensor associated with the unmanned vehicle; and
  periodically associating the position data with radiation data to produce combined data.

Thus, the radiation detection method according to this aspect of the invention includes periodically combining position data with radiation data to produce combined data. This radiation mapping capability using a solid state radiation sensor enables high resolution mapping of radiation levels at particular locations. The radiation and position data are obtained by an unmanned vehicle, which can patrol a monitoring zone within which a radioactive anomaly may occur. Thus, in the event of an increased level of radiation being detected, the combined data produced by the radiation detection device can provide useful information to aid people in the vicinity of the radiation. The use of an unmanned vehicle enables the solid state radiation sensor to remain in close proximity to a target surface within the monitoring zone, which increases the sensitivity of the sensor.

The method may include receiving radiation data from the solid state radiation sensor at least once every second, preferably at least once every 500 ms and more preferably about once every 100 ms. Fast radiation sensor readout enables accurate radiation mapping at a high spatial resolution while the unmanned vehicle is moving. Known solid state radiation sensors, in particular gamma ray detectors, would not have sufficiently fast readout times to enable radiation mapping with sufficient resolution to enable real time mapping of localised radiation anomalies with a vehicle moving at between 0.5-3 m/s.

The method may comprise:
  scanning across a voltage range associated with a detection panel of the radiation sensor, the voltage range corresponding to a range of possible energy values for detected radiation, the voltage range being partitioned into a plurality of sub ranges;
  while scanning, monitoring for instances of detected radiation within the sub ranges;
  and forming radiation data using data relating to instances of detected radiation within the sub ranges.

The step of scanning may comprise less than five, preferably less than three and even more preferably only a single sweep across the voltage range. In embodiments of the invention this enables a fast read out time.

The step of forming radiation data may comprise transmitting data relating to instances of detected radiation within sub ranges to the data processor, but not transmitting data relating to sub ranges in which no radiation has been detected. In embodiments of the invention this enables successive read outs to be performed without delays due to bandwidth unavailability.

Position data may be associated with radiation data at least once every second, preferably at least once every 500 ms and more preferably about once every 100 ms. High frequency data association enables the vehicle to move faster during monitoring without missing areas. Combined data may be formed by assigning an identifier, such as a unique reference, to each of a piece of position data and a piece of radiation data.

The method may comprise:
  during creation of the combined data, moving the unmanned vehicle relative to a target surface so as to spaced therefrom by no more than 5 m.

The unmanned vehicle may be suitable for movement, or configured to move, at speeds of between 0-5 m/s, preferably between 0-3 m/s, more preferably between 0-2 m/s and in some embodiments less than 1 m/s. Slower speeds may lead to increased radiation sensor sensitivity. It has been found that 0-2 m/s provides the optimum trade-off between sensitivity and vehicle progress.

Embodiments of the invention may be used to detect radiation for one of more of the following purposes:
  Rapid disaster response monitoring of nuclear events, providing real-time data on spread, source and intensity. This could range from site incidents to terrorist events.
  Routine monitoring of nuclear sites (internally and externally), mining operations and oil and gas facilities.
  Environmental monitoring for site decommissioning.
  Environmental monitoring of war zones for spent depleted uranium munitions.

BRIEF DESCRIPTION OF THE DRAWINGS

Embodiments of the invention will now be described with reference to the accompanying drawings, in which.

DETAILED DESCRIPTION

Figure 1:
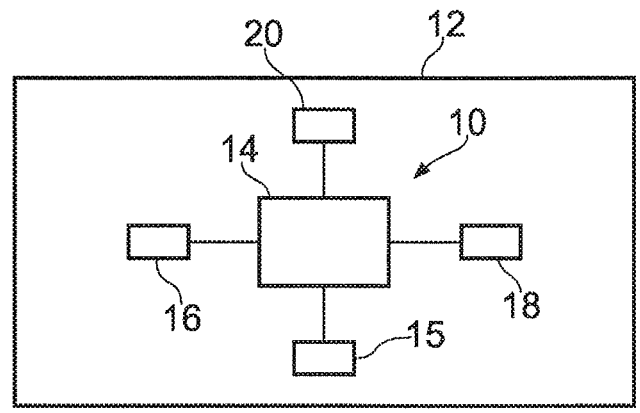
FIG. 1 is a schematic diagram of a radiation detection device according to an embodiment of the invention.

FIG. 1 is a schematic diagram of a radiation detection device 10 according to an embodiment of the invention. The radiation detection device 10 may be arranged to detect point sources of radiation on a target surface, such as the ground.

The radiation detection device 10 is arranged to be physically associated with a unmanned vehicle 12. For example, the radiation detection device 10 may be mounted on, under or in some other way physically coupled with the unmanned vehicle 12. It is preferred that the radiation detection device is physically located within 1 m of a point on the outer surface the unmanned vehicle 12 so as to provide a reasonably small overall envelope, and preferably within 0.5 m.

The radiation detection device 10 includes a data processor 14, which may be any suitable data processor, such a microprocessor or microcontroller; for example, Raspberry Pi™, Arduino™, or Beagleboard™. In some embodiments the data processor 14 may comprise a plurality of data processors.

The data processor 14 is configured to receive position data from a position sensor 16. The position sensor 16 may be any suitable device arranged to provide information relating to the position of the position sensor 16. From this, the position of the radiation detection device 10 and/or the unmanned vehicle 12 can be determined. It is preferred that the position sensor 16 provides three dimensional position data. The position sensor 16 may comprise one or more discrete positioning elements, such as a global positioning system (GPS) detector for providing spatial X and Y position to within +/−10 cm, and a device for measuring differential pressure to provide altitude or Z position to within +/−1 cm, an infrared laser sensor; LIDAR, an acoustic sensor. Combinations of sensors may result in more accurate position data. In some embodiments, a Z axis range finder may be included to provide information relating to the underlying target surface.

In other embodiments the position sensor 16 may be provided with pre-existing knowledge of its environment and starting point within the environment and may use sensors to measure and track its movement within the environment.

The data processor 14 is configured to receive radiation data from a solid state radiation sensor 18. Any suitable solid state radiation sensor 18 i.e. semiconductor radiation sensor may be provided to convert x-ray or gamma-ray photons into electrons. Such detectors can be tuned only to except gamma rays of a given energy. Preferably, a cadmium zinc telluride detector is used because such detectors have a high sensitivity to gamma-rays and desirable energy resolution. A solid state radiation sensor 18 enables a fast read out in comparison with other types of radiation sensors such as scintillating tubes. A fast radiation sensor readout may lead to increased spatial resolution when used in conjunction with a moving unmanned vehicle. It is preferred that the radiation sensor 18 is a gamma ray spectroscope as this enables both radiation intensity and radionuclide type to be determined. For high radiation applications or long terms exposure, it is preferable to use a single crystal or polycrystalline diamond wafer detector.

A memory device 15 is provided in communication with the data processor 14. The memory device 15 may comprise one or more memory devices. The memory device 15 stores control software and device drivers for enabling the data processor 14 to communicate with the position sensor 16 and the solid state radiation sensor 18 and to produce combined data.

The radiation sensor device driver is configured to vary the potential difference (PD) over the detection panel within a voltage range, such as 0-500V, and at a particular frequency, such as 100 Hz. The voltage range relates to a range of possible detected energy values. The range of possible detected energy values is partitioned into groups or 'bins'. A fewer number of bins may improve processing efficiency. The number and configuration of bins may be determined by a radiation source of interest. As the PD varies, a 'count' is placed in a bin if the radiation sensor is detecting radiation at an energy level corresponding to the bin. The driver is configured such that a radiation sensor readout comprises a single sweep across the PD range at a slower rate than the PD frequency. During the single sweep, the driver notes which bins have counts and, once noted, deletes the counts. Once the sweep has been completed, the driver sends data relating to only the bins with counts to the data processor to form combined data. The single sweep provides for a fast read out time. The sending of count data only increases transmission efficiency, reducing the likelihood of the entire channel bandwidth being unavailable for a subsequent sweep transmission.

The position sensor device driver is configured to receive information relating to the XYZ location of the position sensor 16. The driver obtains X and Y location preferably through differential GPS using multiple satellites where available. The driver obtains Z values from differential air pressure combined with an acoustic array (or similar) to gain information of topography around the platform. This is relayed to the processing unit 14.

The data processor 14 is configured to periodically associate position data from the position sensor 16 with radiation data from the radiation sensor 18 to form combined data which represents a level of radiation at a particular location. The frequency of combined data generation is generally limited by the read out time for the radiation sensor 18. Combined data may be formed by assigning corresponding pieces of position data and radiation data with a unique reference, such as radiation sensor 18 readout time. In most embodiments, combined data will be formed each time the radiation sensor 18 is read out, but in some embodiments the data processor 14 may be configured to read out from the position sensor 16 less frequently and interpolate the position data read out values to obtain estimated position data for use in combined data; this may be acceptable in embodiments in which the unmanned vehicle 12 is unlikely to depart from a configured travel path. It is preferred that corresponding radiation and position data are temporally synchronised i.e. correspond to the same point in time, as this provides a high degree of spatial accuracy. It will however be appreciated that in practice a small temporal delay will generally exist, and a larger temporal delay may be acceptable for some applications such as those in which the unmanned vehicle is arranged to move along a travel path at 0.1 m/s or less.

The data processor 14 may be configured to associate position data with radiation data at least once every second, preferably at least once every 500 ms and more preferably about once every 100 ms. High frequency data association enables the unmanned vehicle 12 to move faster during monitoring without missing areas.

The data processor 14 may be in communication with an input/output (I/O) module 20, such as a wireless transceiver, to enable position data, radiation data and/or combined data to be transmitted to a remote device. The I/O module 20 may also be used to receive instructions for controlling the unmanned vehicle 12. In some embodiments signals may be sent to and from the unmanned vehicle via a flexible tether wire.

Thus, the radiation detection device according to the first aspect of the invention includes a data processor which periodically combines position data with radiation data to produce combined data. The use of a solid state radiation sensor enables high resolution mapping of the radiation level at particular locations. The radiation and position data originates from an unmanned vehicle, which can patrol a monitoring zone within which a radioactive anomaly may occur. Thus, in the event of an increased level of radiation being detected, the combined data produced by the radiation detection device can provide useful information to aid people in the vicinity of the radiation. The use of an unmanned vehicle enables the solid state radiation sensor to remain in close proximity to a target surface within the monitoring zone, which increases the sensitivity of the sensor.

Figure 2:
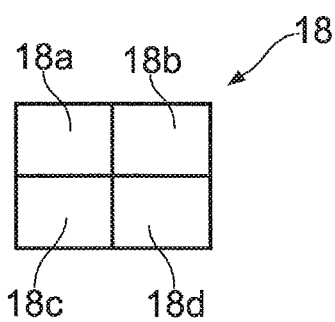
FIG. 2 is a schematic diagram of a multi panel radiation sensor.

In some embodiments the radiation sensor 18 may comprise an array of planar semiconductor detection panels 18a-18d operable in parallel, as illustrated in FIG. 2. This may provide a more robust radiation sensor because damage to a subset of the panels will reduce the overall sensitivity of the radiation sensor rather than render the entire radiation sensor inoperable. The plurality of detection panels 18a-18d may be provided by co-locating a plurality of single panel radiation sensors 18.

Figure 3:
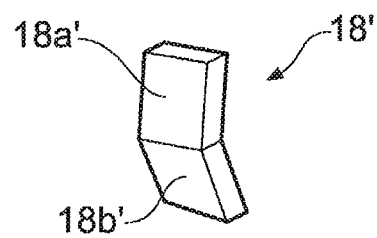
FIG. 3 is a schematic diagram of a multi panel radiation sensor having panels at different orientations.

As illustrated in FIG. 3, in some embodiments the orientation of a first panel 18a' of the radiation sensor 18' may differ to that of another panel 18b'. The orientation of each panel may differ to that of each other panel.

Figure 4:
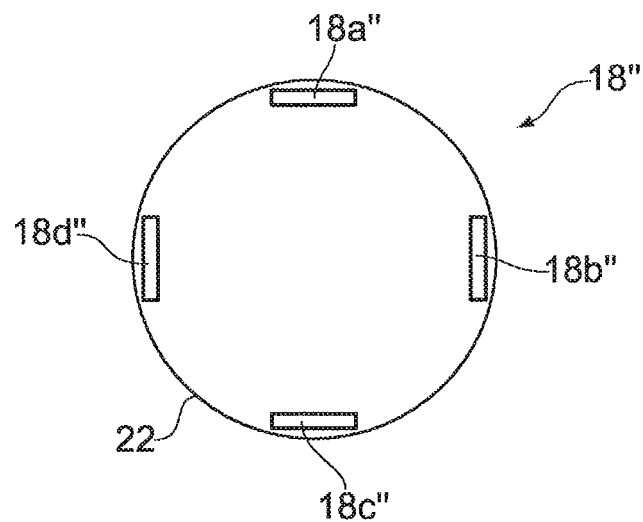
FIG. 4 is a schematic diagram of a multi panel radiation sensor.

As illustrated in FIG. 4, in some embodiments the detection panels 18a"-18d" may be arranged to define a periphery of a geometrical shape 22, such as a circle, a rectangle, an oval or the like. The detection panels 18a"-18d" are arranged to face the periphery of the geometrical shape 22. This enables the radiation sensor 18" to conform to the inner surface of a pipe or the like, along which the unmanned vehicle is arranged to travel.

Figures 5A, 5B:
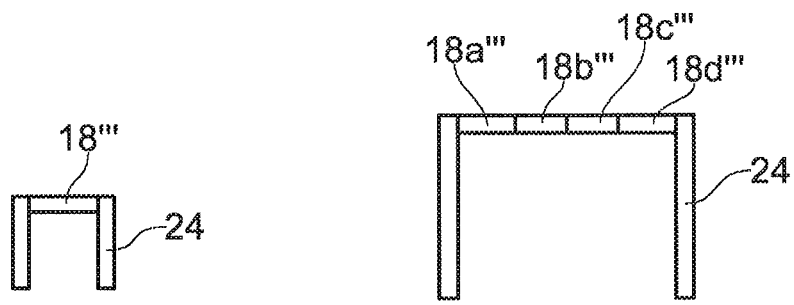
FIGS. 5a and 5b are schematic diagrams of collimated radiation sensors.

The radiation sensor according to embodiments of the invention may be collimated; for example; as shown in FIGS. 5a and 5b, the detector panel 18''' or panels 18a'''-18d''' may each or together be enclosed by a collar 24 extending from the periphery of the detector area generally orthogonally with respect thereto. Collimating the radiation sensor has the advantage of reducing noise from background radiation.

In embodiments of the invention, the total radiation sensor 18 area defined by the one or more detection panels may be at least 10 cm$^2$ in size, preferably at least 50 cm$^2$ in size, more preferably at least 100 cm$^2$ in size. In some embodiments, each detection panel may be at least 10 cm$^2$ in size, preferably at least 50 cm$^2$ in size, more preferably at least 100 cm$^2$ in size. This provides a sensitive detector capable of detecting 100 Bq or 2×10$^6$ mCi at a distance of 3 m when travelling at a speed of up to 3 m/s.

The radiation detection device may have a mass of 5 kg or less, preferably of 1.5 kg or less, more preferably of 1 kg of less and even more preferably of 500 g or less. A lighter device may increase the operational capacity of the unmanned vehicle.

In some embodiments an attitude stabilisation device, such as a gyroscopic platform, may be provided that is arranged to maintain the orientation of the radiation sensor 18 during movement of the unmanned vehicle 12. This may increase spatial sensitivity.

During creation of the combined data the unmanned vehicle may be configured to move relative to a target surface so as to spaced therefrom by no more than 5 m, preferably by no more than 4 m, more preferably by no more than 3 m and even more preferably by no more than 2 m. It is preferred that the unmanned vehicle is close to the target surface during detection of radiation, since this will generally result in more radioactive energy being collected by the detector from a source on the target surface, giving improved sensitivity. Spatial resolution may also be improved.

The unmanned vehicle may be configured to move at speeds of between 0-5 m/s, preferably between 0-3 m/s, more preferably between 0-2 m/s and preferably less than 1 m/s. Slower speeds lead to increased radiation sensor sensitivity. It has been found that 0-2 m/s provides the optimum trade-off between sensitivity and vehicle progress.

The radiation detection device according to embodiment of the invention may be used with any suitable unmanned vehicle; for example, an unmanned aerial vehicle, such as a multi rotor air vehicle, or an unmanned ground vehicle, or an unmanned submersible/underwater vehicle. When using a multi rotor air vehicle it is preferable to use six or more rotors to provide increased stability. The choice of vehicle may be influenced by the type of monitoring zone, as will now be illustrated. In some embodiments the unmanned vehicle may be arranged to move autonomously.

An unmanned air vehicle may be particularly suitable for monitoring sites such as nuclear facilities, due to the maneuverability of a unmanned air vehicle over potentially difficult terrain. When a unmanned air vehicle is provided, it is preferred that the unmanned air vehicle is controlled to move relative to a target surface within the monitoring zone at a distance of less than 5 m therefrom. Due to the generally omnidirectional radiation pattern emitted from a radioactive source, such close proximity to the target surface may increase the sensitivity of the detector. A blimp or the like may be useful for longer monitoring periods in windless environment.

An unmanned ground vehicle may be particularly suitable for floors of buildings, confined spaces or as a pipe crawler.

An unmanned submersible vehicle may be particularly suitable as a pipe crawler in flooded pipes, storage/cooling ponds, lakes and the like.

Figure 6:
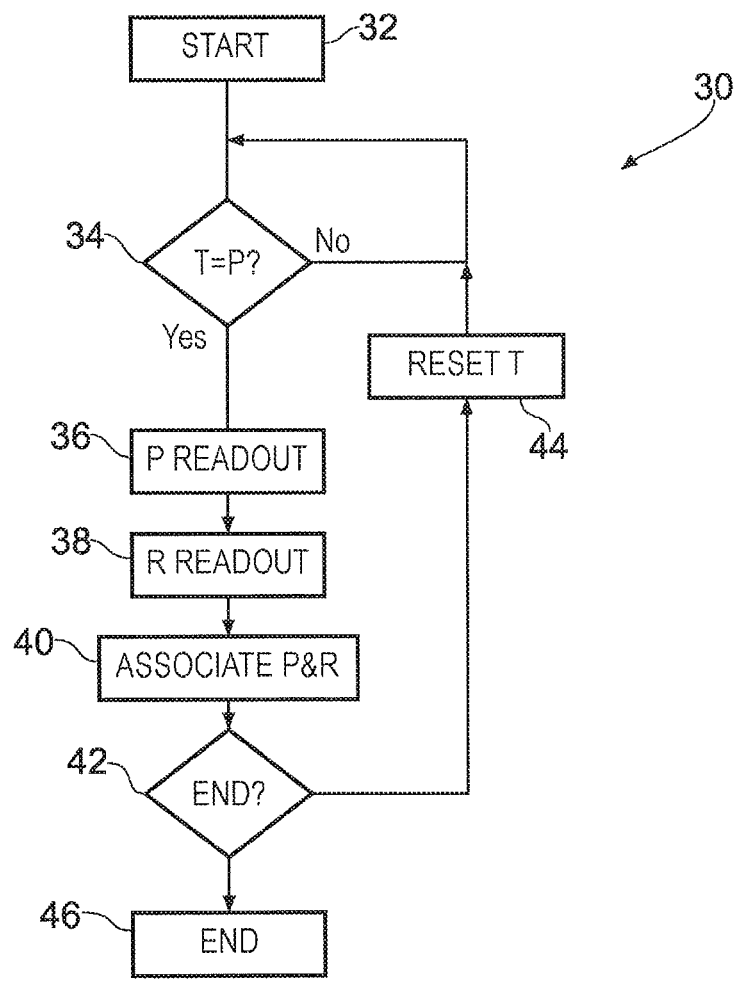
FIG. 6 is a flow chart illustrating a method of detecting radiation according to an embodiment of the invention.

FIG. 6 illustrates a method 30 for detecting radiation according to an embodiment of the invention.

At stage 32 the method begins.

At stage 34, the method determines whether an elapsed time T is equal to the association period P. If not, the method returns to stage 34. If so, the method progresses to stage 36

At stage 36, the method reads out position data from the position sensor that is associated with an unmanned vehicle.

At stage 38 the method reads out radiation data from the radiation sensor that is associated with the unmanned vehicle.

At stage 40 the method associates the radiation data with the position data to form combined data.

At stage 42 the method determines whether to end, which may be based on the operational capacity of the unmanned vehicle. If a decision is taken not to end, the method progresses to stage 44. If a decision is taken to end, the method progresses to stage 46.

At stage 44 the elapsed time is reset and the method progresses to stage 34.

At stage 46 the method ends.

The association period may be at least once every second, preferably at least once every 500 ms and more preferably about once every 100 ms. Fast radiation sensor readout enables accurate radiation mapping at a high spatial resolution while the unmanned vehicle is moving.

A device driver for the radiation sensor may be configured to scan across a voltage range associated with a detection panel of the radiation sensor, the voltage range corresponding to a range of possible energy values for detected radiation, the voltage range being partitioned into a plurality of sub ranges; and while scanning, monitor for instances of detected radiation within the sub ranges. Data relating to instances of detected radiation within the sub ranges may be output as radiation data readout to be combined with position data.

The step of scanning may comprise five or less sweeps across the voltage range. It is preferred that less than three sweeps are performed and even more preferably only a single sweep is performed across the voltage range. In embodiments of the invention this enables for a fast read out time. A sensitive radiation sensor increases the likelihood of radiation from a point source being detectable by a low number of sweeps. The size of the solid state detection plate(s) and the distance from the source of radiation affects the sensitivity of the radiation sensor.

The step of outputting may comprise transmitting data relating to instances of detected radiation within sub ranges to the data processor, but not transmitting data relating to sub ranges in which no radiation has been detected.

During creation of the combined data, the unmanned vehicle may be operated so as to move relative to a target surface so as to spaced therefrom by no more than 5 m.

During creation of the combined data, the unmanned vehicle may be controlled to move at an average speed of 0-3 m/s.

Figure 7:
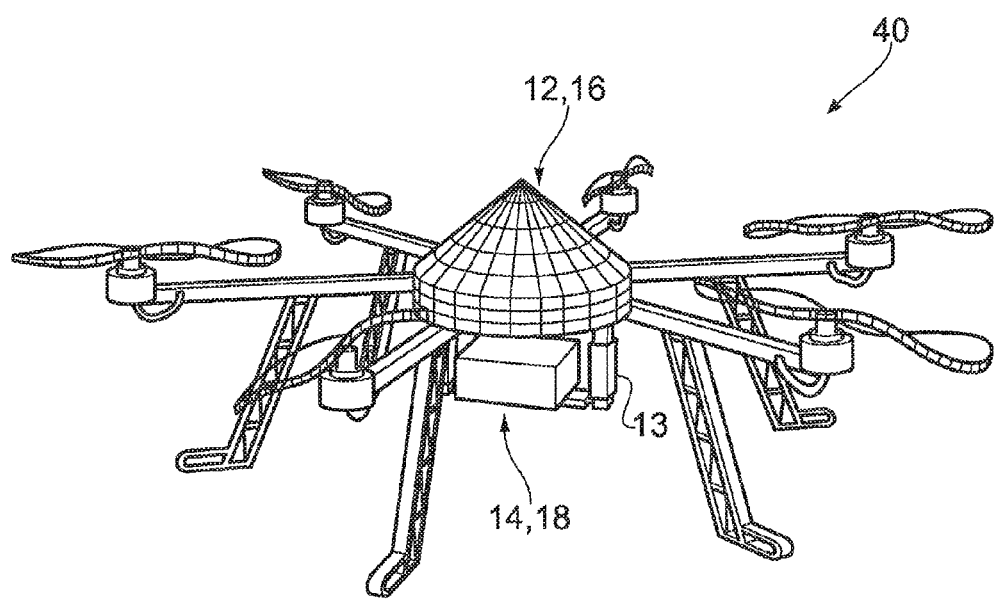
FIG. 7 is a diagram of an unmanned aerial vehicle and a radiation detection device according to an embodiment of the invention.

FIG. 7 shows an embodiment of the invention in which the unmanned vehicle 12 is a commercially available multirotor hexacopter unmanned aerial vehicle sold by MicroKopter under the trade name MicroKopter Hexa XL. The unmanned aerial vehicle 12 provides flight times of up to 30 minutes. The unmanned aerial vehicle 12 platform provides high precision control on location, altitude and flight speed, relatively independent of wind-speed. It is able to hover for minutes at a time over a specified point or even land if required.

The unmanned aerial vehicle 12 is able to perform differential GPS to determine spatial X, Y position to within +/−10 cm. The altitude (Z) of the system is determined using differential air pressure analysis. This entails comparing starting ground air pressure with travelling vehicle air pressure, such that vehicle Z position is determined to within +/−1 cm.

The unmanned aerial vehicle 12 is controlled to move between GPS way points at a speed of between 0-3 m/s and at an altitude of between 1-4 m The radiation sensor 18 is a solid state gamma spectrometer Kromek GR1™ produced by Kromtek Ltd and having the following specifications:

Detector: 10 mm×10 mm×10 mm CdZnTe coplanar-grid detector
Energy range: 20 keV to 3.0 MeV
Energy resolution: 2.0-2.5% FWHM @ 662 keV
Electronic noise: <10 keV FWHM
Maximum throughput: 32,000 counts/s
Number of channels: 4096 (12 bit)
Differential non-linearity: <±1%
Integral non-linearity: <±0.02%
Power consumption: 250 mW
Dimensions: 25 mm×25 mm×63 mm
Weight: 60 gram The radiation sensor 18 is mounted on a commercially available piezo-controlled stabilisation platform 13 to ensure the radiation sensor 18 points vertically downwards at all times, thereby maintaining spatial sensitivity.

The radiation sensor 18 is integrated with a lightweight Raspberry Pi™ computing board 14. Hardware drivers as described above with reference to FIG. 1 enable communication between the radiation sensor 18 and the board 14, and the flight computer of the unmanned aerial vehicle and the board 14 in order to obtain position data.

During flight, X,Y,Z data is logged every 500 ms and recorded to an onboard microSD card. Control software on the Raspberry Pi 14 is arranged to process and record the spectrometer 18 readouts at a high frequency (>1 point every 10 milliseconds), and to integrate this arising data with positional data, such that the GPS positional data is recorded with the radiation measurement at each location.

The Raspberry Pi 14 is arranged to cause the combined data stream to be transmitted to a remote base station where it may be further processed.

The features of this embodiment provide the ability to acquire gamma radiation spectra from any single location for periods of several tens of seconds to minutes.

Attributes of the unmanned aerial vehicle mounted radiation detection device of the illustrated embodiment include:
1) The ability to detect radiation with a high sensitivity, typically at low dose rates (<10 counts per second, <0.2 nCi).
2) Be collimated (if required), such that it has a ground spatial resolution <1 m.
3) Identify the radioactive elements responsible for the radioactivity.
4) Low energy consumption.
5) Possess the ability to continuously record and transmit both radiation signal and positional data at short time intervals (<1 sec, optimally c. 10 ms sampling rate).
6) Exhibit reasonable tolerance to radiation damage.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A radiation detection device comprising a data processor arranged to be communicatively coupled to a position sensor mounted on an unmanned vehicle and a solid state radiation sensor mounted on the unmanned vehicle, the data processor configured to:
receive position data from the position sensor;
receive radiation data from the solid state radiation sensor; and periodically associate the position data with radiation data to form combined data,
wherein during creation of the combined data the unmanned vehicle is configured to move at a speed of less than 5 m/s.

2. The radiation detection device of claim 1, wherein the data processor is configured to associate position data with radiation data at least once every second.

3. The radiation detection device of claim 1, further comprising a device driver for controlling readout from the radiation sensor, the device driver configured to provide a sensor readout which comprises: scanning across a voltage range associated with a detection panel of the radiation sensor, the voltage range corresponding to a range of possible energy values for detected radiation, the voltage range being partitioned into a plurality of sub ranges; while scanning, monitoring for instances of detected radiation within the sub ranges; and transmitting data relating to instances of detected radiation within the sub ranges to the data processor.

4. The radiation detection device of claim 3, wherein the device driver is configured to provide a sensor readout by performing less than five sweeps across the voltage range.

5. The radiation detection device of claim 3, wherein the device driver is configured to transmit data relating to instances of detected radiation within sub ranges to the data processor, but not transmit data relating to sub ranges in which no radiation has been detected.

6. The radiation detection device of claim 1, wherein the data processor is mounted on the unmanned vehicle.

7. The radiation detection device of claim 1, wherein the data processor is configured to save the combined data in a memory device and/or transmit the combined data to a remote device.

8. The radiation detection device of claim 1, wherein the position sensor comprises one or more of a: GPS device; a differential fluid pressure sensor; an infrared laser sensor; Light Detection and Ranging (LIDAR); an acoustic sensor; and a device for measuring the distance between the radiation detection device and the underlying surface.

9. The radiation detection device of claim 1, wherein the radiation sensor is collimated.

10. The radiation detection device of claim 1, wherein the radiation detection device has a mass of 5 kg or less.

11. The radiation detection device of claim 1, wherein the unmanned vehicle maintains the solid state sensor a distance of 5 m or less from a target surface.

12. The radiation detection device of claim 1, further comprising an attitude stabilisation device arranged to maintain the orientation of the solid state radiation sensor during movement of the unmanned vehicle.

13. The radiation detection device of claim 1, wherein the unmanned vehicle is a multi-rotor platform.

14. The radiation detection device of claim 1, wherein the unmanned vehicle is configured not to stop during creation of the combined data.

15. The radiation detection device of claim 1, wherein the unmanned vehicle is configured to create the combined data a plurality of times as the unmanned vehicle moves in a first direction.

16. A radiation detection device comprising a data processor arranged to be communicatively coupled to a position sensor mounted on an unmanned vehicle and a solid state radiation sensor mounted on the unmanned vehicle, the data processor configured to:
receive position data from the position sensor;
receive radiation data from the solid state radiation sensor; and
periodically associate the position data with radiation data to form combined data, wherein during creation of the combined data the unmanned vehicle is configured to move, relative to a target surface so as to be spaced therefrom by no more than 5 m.

17. A radiation detection device comprising a data processor arranged to be communicatively coupled to a position sensor mounted on an unmanned vehicle and a solid state radiation sensor mounted on the unmanned vehicle, the solid state radiation sensor is a semiconductor radiation sensor comprising a plurality of semiconductor detection panels, the orientation of a first detection panel of the plurality of semiconductor detection panels differs from that of another detection panel of the plurality of semiconductor detection panels, the data processor configured to:
receive position data from the position sensor;
receive radiation data from the solid state radiation sensor; and
periodically associate the position data with radiation data to form combined data wherein a total detection area of the radiation sensor defined by one or more detection panels of the plurality of semiconductor detection panels is at least 10 $cm^2$ in size.

18. A method comprising:
receiving position data from a position sensor associated with an unmanned vehicle;
receiving radiation data from a solid state radiation sensor associated with the unmanned vehicle;
periodically associating the position data with radiation data to produce combined data to detect radiation; and
moving the unmanned vehicle at a speed of less than 5 m/s during creation of the combined data.

19. The method of claim 18, wherein the position data is associated with radiation data at least once every second.

20. The method of claim 18, further comprising:
scanning across a voltage range associated with a detection panel of the radiation sensor, the voltage range corresponding to a range of possible energy values for detected radiation, the voltage range being partitioned into a plurality of sub ranges;
while scanning, monitoring for instances of detected radiation within the sub ranges;
and reading out radiation data using data relating to instances of detected radiation within the sub ranges.

21. The method of claim 18, wherein during creation of the combined data, moving the unmanned vehicle relative to a target surface so as to spaced therefrom by no more than 5 m and/or obtaining distance information to the underlying surface.

22. An unmanned aerial vehicle comprising a radiation detection device comprising a data processor communicatively coupled to a position sensor mounted on the unmanned aerial vehicle and a solid state radiation sensor mounted on the unmanned aerial vehicle, the radiation detection device configured to detect ionizing radiation, the data processor configured to:
receive position data from the position sensor;
receive radiation data from the solid state radiation sensor; and
periodically associate the position data with radiation data to form combined data representative of a level of radiation at a location, wherein during creation of the combined data the unmanned aerial vehicle is configured to move at a speed of less than or equal to 5 m/s, wherein the position sensor has a sensor for determining the distance between the unmanned aerial vehicle and an underlying surface.

\* \* \* \* \*

UNITED STATES PATENT AND TRADEMARK OFFICE
CERTIFICATE OF CORRECTION

PATENT NO. : 10,473,794 B2
APPLICATION NO. : 14/774003
DATED : November 12, 2019
INVENTOR(S) : Thomas Scott and James Macfarlane Page 1 of 1

It is certified that error appears in the above-identified patent and that said Letters Patent is hereby corrected as shown below:

In the Specification

In Column 7, Line 64:
"detecting 100 Bq or $2\times10^{6}$" should be "detecting 100 Bq or $2\times10^{-6}$"

Signed and Sealed this
Eleventh Day of February, 2020

Andrei Iancu
*Director of the United States Patent and Trademark Office*